US012113313B2

(12) United States Patent
Zhang et al.

(10) Patent No.: US 12,113,313 B2
(45) Date of Patent: Oct. 8, 2024

(54) FAST SELF-ADAPTIVE ROTARY PLUG-IN UNDERWATER FORCE-BEARING CONNECTOR

(71) Applicant: ZHEJIANG UNIVERSITY, Zhejiang (CN)

(72) Inventors: Feng Zhang, Hangzhou (CN); Kaichen Song, Hangzhou (CN); Yong Wu, Hangzhou (CN); Yang Ning, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 338 days.

(21) Appl. No.: 17/718,343

(22) Filed: Apr. 12, 2022

(65) Prior Publication Data

US 2022/0368068 A1 Nov. 17, 2022

Related U.S. Application Data

(63) Continuation of application No. PCT/CN2021/119355, filed on Sep. 18, 2021.

(30) Foreign Application Priority Data

May 17, 2021 (CN) ......................... 202110535038.9

(51) Int. Cl.
*H01R 13/523* (2006.01)
*H01R 13/512* (2006.01)
(Continued)

(52) U.S. Cl.
CPC ......... *H01R 13/523* (2013.01); *H01R 13/512* (2013.01); *H01R 13/5202* (2013.01); *H01R 13/629* (2013.01); *H01R 13/639* (2013.01)

(58) Field of Classification Search
None
See application file for complete search history.

(56) References Cited

U.S. PATENT DOCUMENTS 4,373,767 A 2/1983 Cairns

FOREIGN PATENT DOCUMENTS

CN 101051716 A 10/2007
CN 203734065 U 7/2014
(Continued)

OTHER PUBLICATIONS

International Search Report (PCT/CN2021/119355); Date of Mailing: Feb. 15, 2022.
First Search (202110535038.9); Date of Mailing: Dec. 29, 2021.

*Primary Examiner* — Tho D Ta
(74) *Attorney, Agent, or Firm* — W&G Law Group

(57) ABSTRACT

Disclosed is a fast self-adaptive rotary plug-in underwater force-bearing connector, which comprises a plug part and a socket part, wherein the plug part comprises a plug housing, a pin arranged in the plug housing, and a push-pull sleeve, a rotary sleeve, a front retaining ring, a ratchet lock nut and a rear retaining ring arranged outside the plug housing; the socket part comprises a socket housing and a jack arranged in the socket housing; the pin and the jack cooperate to connect the plug part and the socket part. The fast self-adaptive rotary plug-in underwater force-bearing connector of the present application can work under the working condition of a large tensile force and has a high reliability.

7 Claims, 10 Drawing Sheets

(51) Int. Cl.

| | |
|---|---|
| ***H01R 13/52*** | (2006.01) |
| ***H01R 13/629*** | (2006.01) |
| ***H01R 13/639*** | (2006.01) |

(56) References Cited

FOREIGN PATENT DOCUMENTS

| | | | | | |
|---|---|---|---|---|---|
| CN | 206364283 | U | | 7/2017 | |
| CN | 109560420 | A | | 4/2019 | |
| CN | 109638553 | A | | 4/2019 | |
| CN | 109659761 | A | * | 4/2019 | ......... H01R 13/2407 |
| CN | 111864457 | A | * | 10/2020 | |
| CN | 111883974 | A | * | 11/2020 | |
| CN | 213093507 | U | | 4/2021 | |
| CN | 113178740 | A | | 7/2021 | |
| EP | 0048601 | A2 | | 3/1982 | |
| EP | 0982814 | A3 | | 5/2002 | |

* cited by examiner

FAST SELF-ADAPTIVE ROTARY PLUG-IN UNDERWATER FORCE-BEARING CONNECTOR

CROSS-REFERENCE TO RELATED APPLICATIONS

The present application is a continuation of International Application No. PCT/CN2021/119355, filed on Sep. 18, 2021, which claims priority to Chinese Application No. 202110535038.9, filed on May 17, 2021, the contents of both of which are incorporated herein by reference in their entireties.

TECHNICAL FIELD

The present disclosure refers to the technical field of underwater connectors, and in particular relates to a fast self-adaptive rotary plug-in underwater force-bearing connector. The structure can meet the requirements of quick connection, self-locking mating or disassembly of plug connectors and socket connectors, and most importantly, it can meet the requirement that the underwater connector works reliably and normally under the working condition of a large tensile force (such as a tensile force of 100 kN).

BACKGROUND

The mating modes of underwater connectors generally include threaded connection, bayonet connection, push-in connection, push-pull connection and so on.

Among the above mating modes, the push-in connection is a common structure of a self-locking underwater connector, the insertion action is simple and fast, only axial forward and backward operation is needed, and automatic lock can be realized upon complete insertion. However, since the self-locking mechanism is an elastic structure, the structure cannot bear a large axial tensile force. The commonly used thread connection method of underwater connectors, although reliable in connection and excellent in tensile performance, requires a screwing operation, and a certain torque is applied for connection in place, so self-locking cannot be realized.

Most of the existing underwater connectors have no force-bearing function, and cannot bear the tensile force of more than 100 kN. When the underwater connectors are subjected to a great tensile force, they will deform or even be destroyed, thus failing. For example, in a towed array composed of many nodes, electrical and force-bearing connections need to be provided between the nodes and watertight cables, and at this time, the underwater connectors need to bear a large tensile force, and the dynamic tensile force can even reach 100 kN in extreme cases.

The existing force-bearing underwater connectors use steel wire force-bearing ropes instead of inner cables to bear a tensile force (CN110299646A, Force bearing watertight connector), which only emphasizes the bearing connection between the cable and the connector, but does not mention the bearing performance and effect of the connector, and its key argument lies in protecting the inner cable through the force bearing of the steel wire rope, rather than a connector that can bear a large tensile force (such as 100 kN).

SUMMARY

The purpose of the present disclosure is to increase the tensile structure on the basis of the existing push-in connection structure, improve the axial tensile performance of the structure on the premise of realizing self-locking and ensure the reliability.

The present disclosure is realized by the following technical solution:

A fast self-adaptive rotary plug-in underwater force-bearing connector, including a plug part and a socket part;

the plug part comprises a plug housing, a pin arranged in the plug housing, and a push-pull sleeve, a rotary sleeve, a front retaining ring, a ratchet lock nut and a rear retaining ring arranged outside the plug housing; one end of the plug housing is provided with a submarine cable A; the plug housing is uniformly provided with slider mounting holes for mounting sliders along a radial direction, and the sliders are radially movable along the slider mounting holes; an inner wall of the plug housing is provided with an unequal-width key group for guiding the socket part, and the keys of the unequal-width key group are arranged between the sliders; the plug housing is provided with a hoop mounting structure A, and both sides of the hoop mounting structure A are provided with force-bearing bosses A; the plug housing is also provided with a housing pin hole A and a thread A for connecting external equipment; the plug housing is provided with a sealing ring groove A, which is used to seal between the external equipment and the plug housing; the push-pull sleeve is used for pressing the sliders and the rotary sleeve; an end of the push-pull sleeve is provided with a stop block mounting hole for mounting a stop block, the stop block is used for clamping the ratchet lock nut to prevent the threaded connection from being loosened, and the other end of the stop block is provided with a spring which is used for ejecting the stop block to lock the ratchet lock nut; the push-pull sleeve is provided with a push-pull sleeve pin mounting hole for mounting a threaded pin, and the threaded pin is used for preventing the stop block from sliding out and rotating; the rotary sleeve is provided with a slider pin groove, and the slider is provided with a slider pin, and the slider pin groove is matched with the slider pin to realize a radial movement of the sliders by rotating the rotary sleeve, thereby realizing the locking and unlocking of the plug part and the socket part; the plug housing is also provided with a rear retaining ring groove for installing the rear retaining ring, and the rear retaining ring is used for preventing the ratchet lock nut from slipping out; the plug housing is also provided with a front retaining ring groove for installing the front retaining ring, and the front retaining ring is used for preventing the rotary sleeve from slipping out;

the socket part comprises a socket housing and a jack arranged in the socket housing; the pin and the jack are matched to connect the plug part and the socket part; one end of the socket housing is provided with a submarine cable B, and the submarine cable B and the submarine cable A are coaxially arranged; the socket housing is provided with a hoop mounting structure B, and both sides of the hoop mounting structure B are provided with force-bearing bosses B; the socket housing is provided with a slider groove matched with the slider and a bell mouth guide keyway group matched with the unequal-width key group, and an insertion end of the bell mouth guide keyway group is trumpet-shaped and thereby convenient for the unequal-width key group to be smoothly inserted within a certain angle range so as to insert the pin into the jack; the socket housing is also provided with a sand-proof sealing ring groove for installing a sealing ring to keep sand out; the socket housing is also provided with a housing pin hole B and a thread C for connecting the external equipment; the socket housing is provided with a sealing ring groove B, and a sealing ring is installed at the sealing ring groove B to seal between the external equipment and the socket housing.

In the above technical solution, furthermore, the unequal-width key group at least comprises two keys with unequal widths, and the keys are used to provide guidance for the plug part to be inserted into the socket part.

Furthermore, one end of the stop block is provided with a fixture block, the other end is provided with a spring mounting block, the stop block is provided with a screw pin matching groove for matching with a screw pin, the stop block is also provided with a stop block tool hole, and the push-pull sleeve is provided with a push-pull sleeve tool hole, and tools are inserted into the stop block tool hole and the push-pull sleeve tool hole to move the stop block.

Furthermore, one side of the ratchet lock nut is provided with ratchet teeth for matching with the fixture block; the inside of the ratchet lock nut is divided into two parts; one part is provided with a ratchet thread, and the plug housing is provided with a thread B, and the ratchet thread is matched with the thread B so that the ratchet lock nut presses the push-pull sleeve; the other part is provided with a smooth surface, and an inner diameter of the smooth surface is smaller than that of the ratchet thread, thereby avoiding abrasion caused by contact between the ratchet thread and the plug housing; an outer surface of the ratchet lock nut is provided with a lock nut tool hole for inserting a tool to lock the ratchet lock nut; the outer surface of the ratchet lock nut is provided as a knurled surface for increasing friction and facilitating assembly and disassembly.

Furthermore, the slider pin groove is an arc whose radius gradually increases with the angle; an outer surface of the rotary sleeve is provided with a tool hole for inserting a tool so as to realize the rotation of the rotary sleeve.

Furthermore, a push-pull sleeve guide keyway is arranged inside the push-pull sleeve, a plug housing guide keyway is arranged outside the plug housing, a guide key is fixed on the plug housing guide keyway, and the push-pull sleeve guide keyway is matched with the guide key to ensure the uniqueness of insertion of the push-pull sleeve; an outer surface of the push-pull sleeve is provided with a surface knurled structure, which is used to increase friction and facilitate push and pull.

Furthermore, a material around the slider on the plug housing is thickened.

The present disclosure has the following advantages:

The device of that application can work under the working condition of a high tensile force, and has a high reliability, and the connector with the maximum out diameter of 75 mm has been made into a prototype and subjected to a tension test, and the breaking strength is 370 kN. The plug part and the socket part of the present disclosure can be conveniently and quickly disassembled by inserting, and have the function of sand prevention; the outer surfaces of the ratchet lock nut and push-pull sleeve are of a knurled structure, which is convenient to disassemble and assemble by hand; the nut can realize self-locking; the structure can be connected with a force-bearing cable housing; the unequal-width key group can ensure that the angular direction of the hoop mounting structure of the plug part and the socket part is consistent.

In the figures: 1 push-pull sleeve, 2 rotary sleeve, 3 front retaining ring, 4 plug housing, 5 slider, 6 unequal-width key group, 7 guide key, 8 stop block, 9 spring, 10 threaded pin, 11 ratchet lock nut, 12 rear retaining ring, 13 pin, 14 submarine cable installation structure A, 15 submarine cable A, 16 submarine cable installation structures A, 17 socket housing, 18 jack, 19 submarine cable. 23 push-pull sleeve guide keyway, 24 surface knurled structure, 25 slider pin groove, 26 tool hole, 27 slider pin, 28 chamfer of unequal-width key group, 29 fixture block, 30 spring mounting block, 31 threaded pin matching groove, 32 stop block tool hole, 33 knurled surface, 34 lock nut tool hole, 35 ratchet teeth, 36 ratchet thread, 37 smooth surface, 38 slider mounting hole, 39 front retaining ring groove, 40 reinforcing structure, 41 plug housing guide keyway, 42 thread B, 43 rear retaining ring groove, 44 bearing boss A, 45 hoop mounting structure A, 46 thread A, 47 sealing ring groove A, 48 housing pin hole A, 49 bell mouth guide keyway group, 50 slider groove, 51 sand-proof sealing ring groove, 52 force-bearing boss B, 53 hoop mounting structure B, 54 housing pin hole B, 55 sealing ring groove B, 56 thread C, 57 rear retaining ring, 58 push-pull sleeve pin mounting hole, 59 push-pull sleeve tool hole.

DESCRIPTION OF EMBODIMENTS

Figure 1:
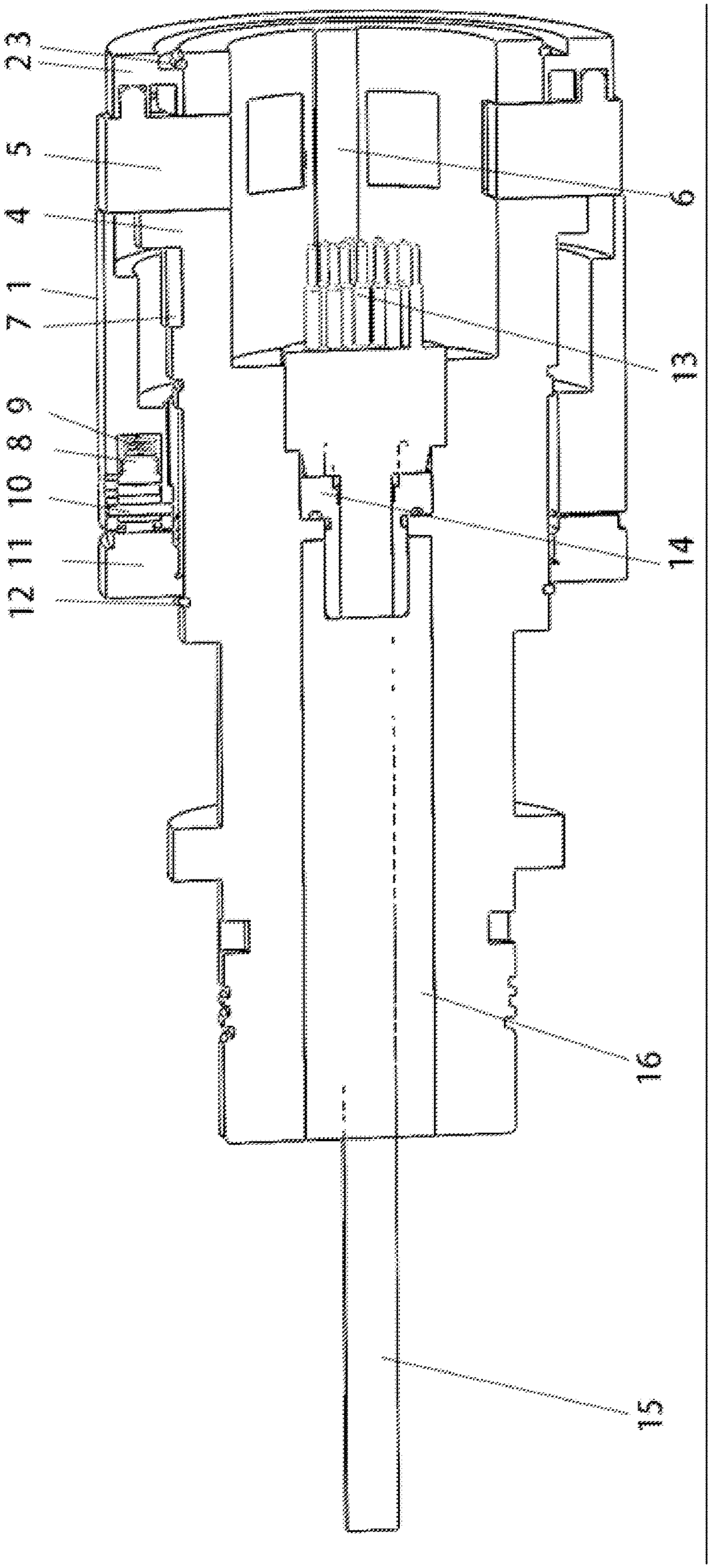
FIG. 1 is a sectional view of a plug part.
Figure 2:
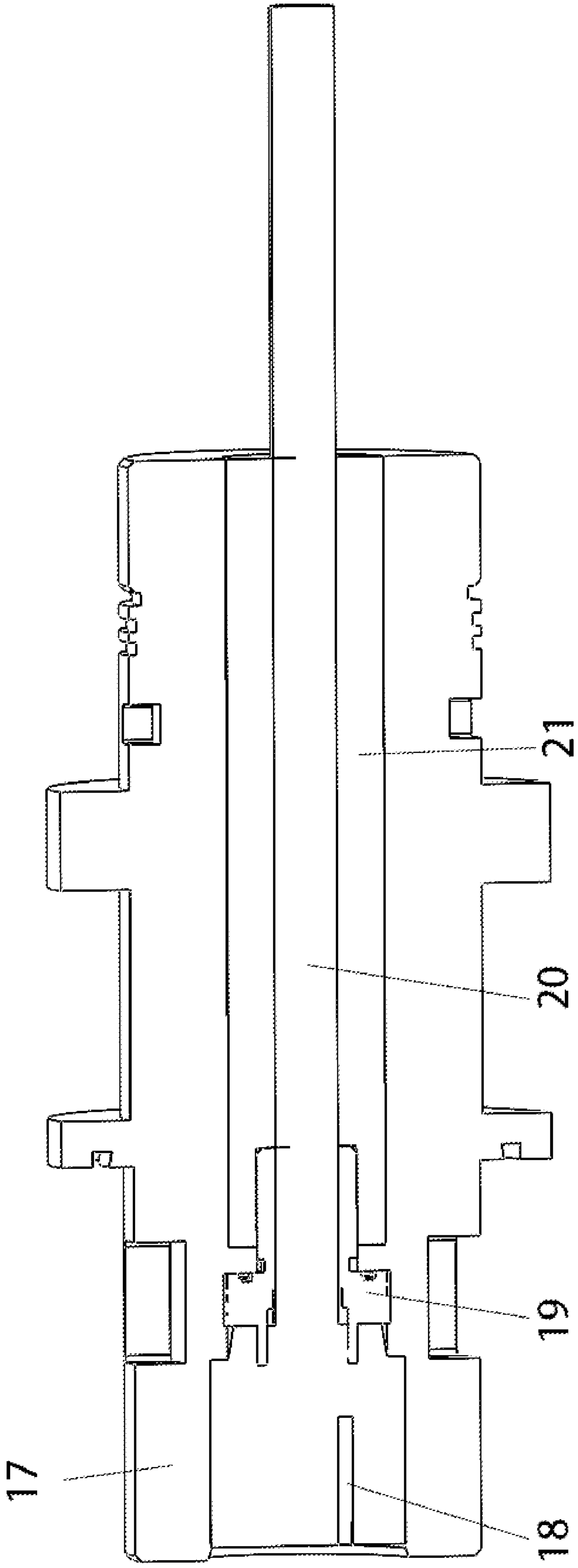
FIG. 2 is a sectional view of a socket part.
Figure 3:
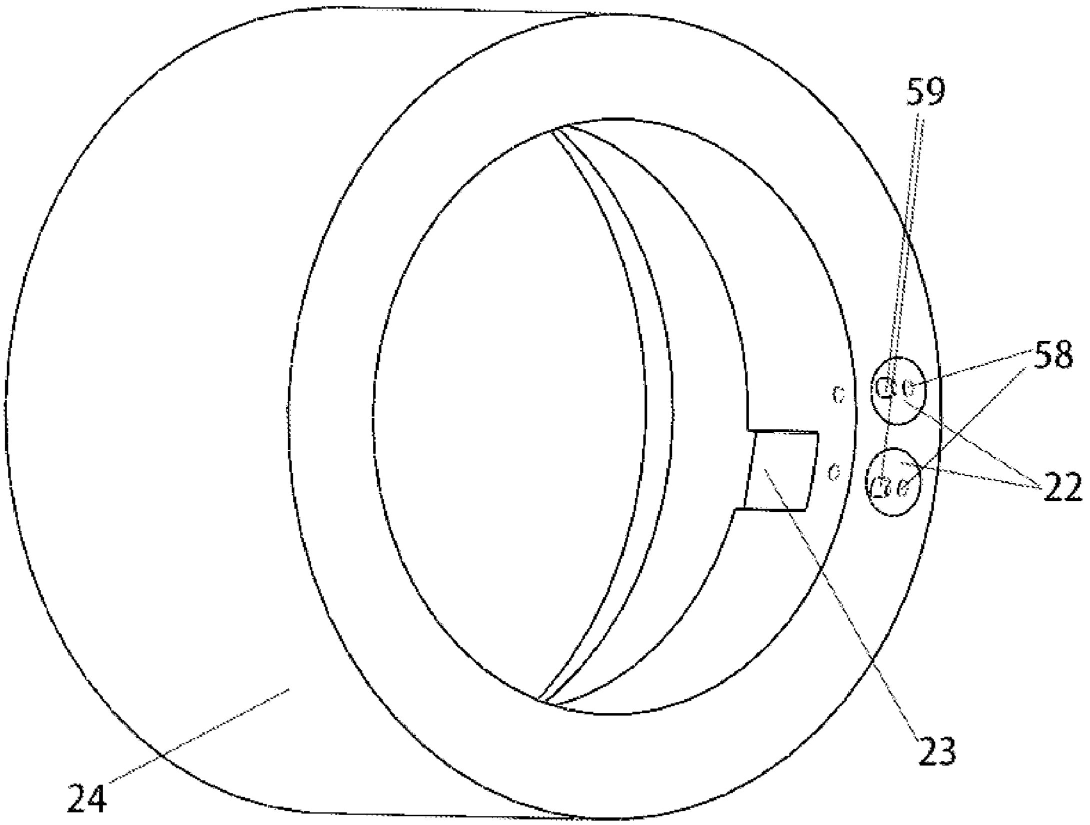
FIG. 3 is a structural diagram of a push-pull sleeve.
Figure 5:
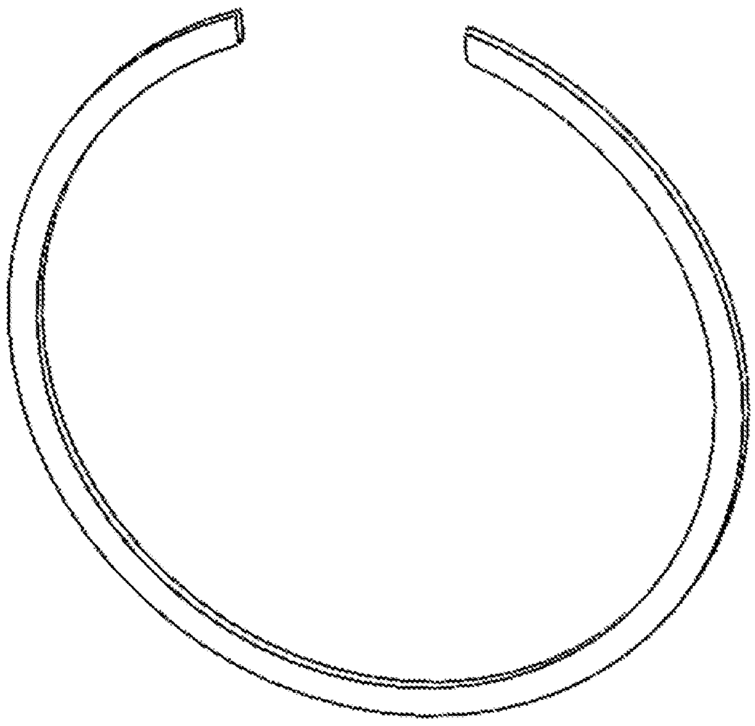
FIG. 5 is a structure diagram of a retaining ring.
Figure 7:
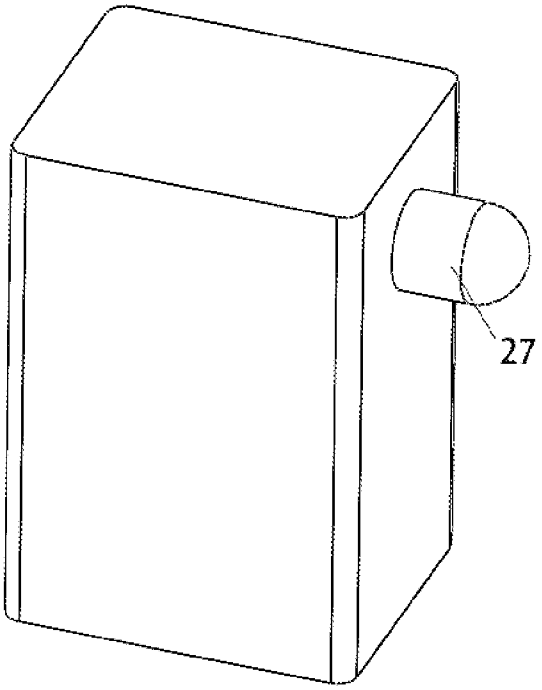
FIG. 7 is a structure diagram of a stop block.
Figure 8:
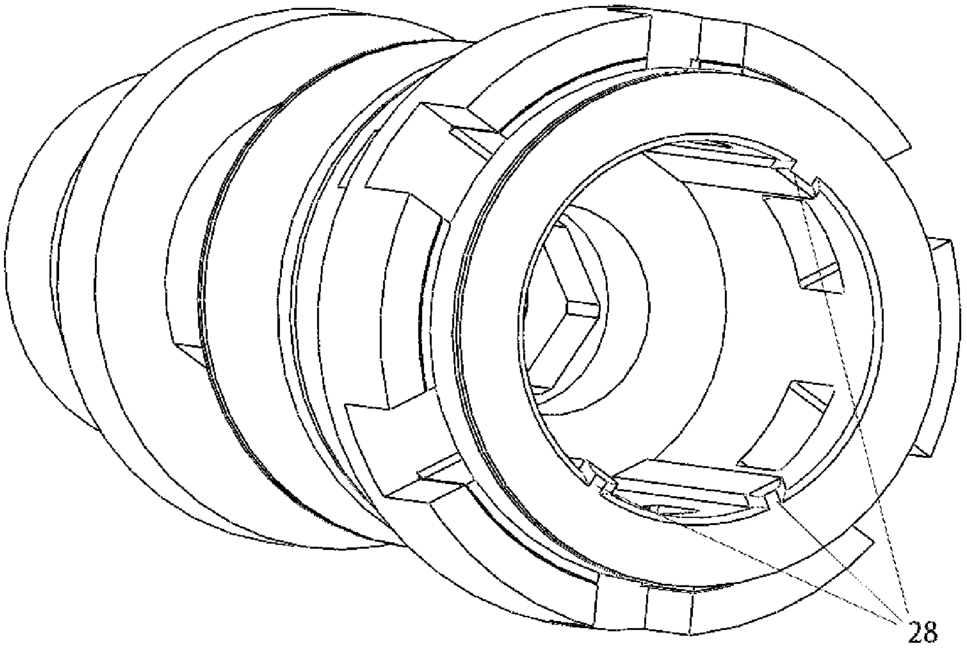
FIG. 8 is a structural diagram of an unequal-width key group.
Figure 11:
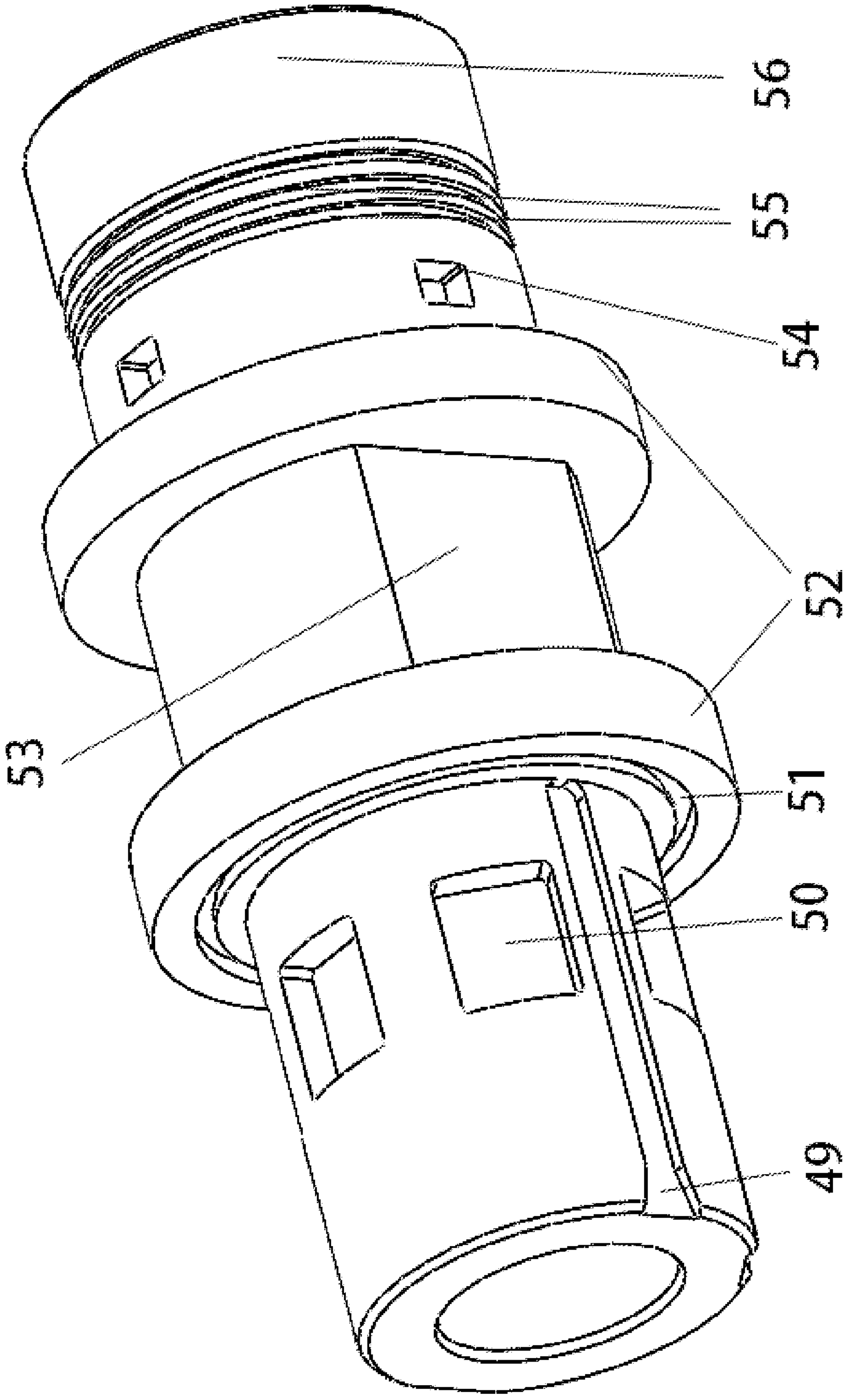
FIG. 11 is a schematic diagram of a socket housing structure.

A fast self-adaptive rotary plug-in underwater force-bearing connector includes a plug part (FIG. 1) and a socket part (FIG. 2); the plug part includes a plug housing 4, a pin 13 arranged in the plug housing 4, and a push-pull sleeve 1, a rotary sleeve 2, a front retaining ring 3, a ratchet lock nut 11 and a rear retaining ring 12 arranged outside the plug housing 4; one end of the plug housing 4 is provided with a submarine cable A15, which is installed on the plug housing 4 through a submarine cable installation structure A14 (which can provide a certain tensile strength) and fixed by a submarine cable installation structure A16 with a sealing and waterproof function; on the inner wall of the plug housing 4, there is an unequal-width key group 6 (FIG. 8) for guiding the socket part, and the keys of the unequal-width key group 6 are arranged between the sliders 5 (FIG. 7); the plug 4 is provided with a hoop mounting structure A45, and both sides of the hoop mounting structure A45 are provided with force-bearing bosses A44; the plug housing 4 is also provided with a housing pin hole A48 and a thread A46 for connecting external equipment; the plug housing 4 is provided with a sealing ring groove A47, which is used to seal between the external equipment and the plug housing 4; the push-pull sleeve 1 is used for pressing the slider 5 and the rotary sleeve 2; the end of the push-pull sleeve 1 is provided with a stop block mounting hole 22 for mounting the stop block 8, the stop block 8 is used for clamping the ratchet lock nut 11 to prevent the screw connection from being loosened, and the other end of the stop block 8 is provided with a spring 9, which is matched with the stop block mounting hole 22 and the stop block 8 to retain a certain preload and can eject the stop block 8 to lock the ratchet lock nut 11; the push-pull sleeve 1 is provided with a push-pull sleeve pin mounting hole 58 for mounting a threaded pin 10 for preventing the stop block 8 from sliding out and rotating; the rotary sleeve 2 is provided with a slider pin groove 25, and the slider 5 is provided with a slider pin 27; the slider pin groove 25 is matched with the slider pin 27 to implement the radial movement of the slider 5 by rotating the rotary sleeve 2, and further implement the locking and unlocking of the plug part and the socket part; the plug housing 4 is also provided with a rear retaining ring groove 43 for mounting a rear retaining ring 57 for preventing the ratchet lock nut 11 from slipping out; the plug housing 4 is also provided with a front retaining ring groove 39 for installing the front retaining ring 3, which is used to prevent the rotary sleeve 2 from slipping out (as shown in FIG. 5, the front retaining ring 3 is an elastic metal ring with an opening, which is used to block the rotary sleeve 2 from falling out; the structure and function of the rear retaining ring 57 is similar to that of the front retaining ring 3);

the socket part includes a socket housing 17 (FIG. 11) and a jack 18 provided in the socket housing 17; the pin 13 and the jack 18 cooperate to connect the plug part and the socket part; one end of the socket housing 17 is provided with a submarine cable B20, which is fixed on the socket housing 17 by a submarine cable installation structure B19 (which can provide a certain tensile strength) and is fixed by a submarine cable installation structure B21 with a sealing and waterproof function; the submarine cable B20 and submarine cable A16 are coaxially arranged; the socket housing 17 is provided with a hoop mounting structure B53, and both sides of the hoop mounting structure B53 are provided with force-bearing bosses B52; the socket housing 17 is provided with a slider groove 50 matched with the slider 5, and a bell mouth guide keyway group 49 matched with the unequal-width key group 6; the insertion end of the bell mouth guide keyway group 49 is trumpet-shaped, which is convenient for the unequal-width key group 6 to be smoothly inserted within a certain angular range (the insertion is smooth even if there is a certain angular deviation, so the insertion process is convenient and fast), so that the pin 13 can be inserted into the socket 18 (the angular directions of the hoop mounting structures of the plug part and the socket part are ensured to be consistent); the socket housing 17 is also provided with a sand-proof sealing ring groove 51 for installing a sealing ring to prevent sand; the socket housing 17 is also provided with a housing pin hole B54 and a thread C56 for connecting external equipment; the socket housing 17 is provided with a sealing ring groove B55, and a sealing ring is installed at the sealing ring groove B to seal between the external equipment and the socket housing 17.

The unequal-width key group 6 includes at least two keys with unequal widths (in this embodiment, the key is a cuboid protrusion directly milled by a milling cutter). The end of each key of unequal-width key group 6 is designed as a chamfer structure, such as the chamfer 28 of the unequal-width key group in FIG. 8, whose function is to prevent hand cutting, which is convenient for matching with and insertion into the bell mouth.

Figure 9:
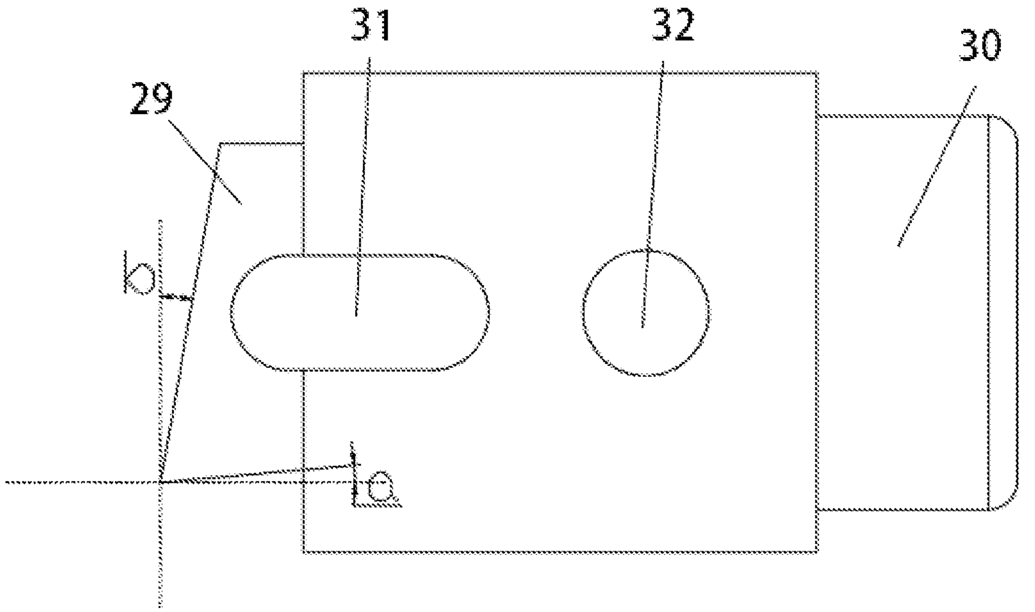
FIG. 9 is a front view of a stop block.

As shown in FIG. 9, one end of the stop block 8 is provided with a fixture block 29, and the other end is provided with a spring mounting block 30. The stop block 8 is provided with a threaded pin matching groove 31 (for ensuring the stroke of the stop block 8 and preventing it from falling out of the stop block mounting hole 22) and a stop block tool hole 32 (for inserting a tool to pull the stop block 8 back to disassemble the structure); the push-pull sleeve 1 is provided with a push-pull sleeve tool hole 59, and tools are inserted into the stop block tool hole 32 and the push-pull sleeve tool hole 59 to move the stop block 8. The fixture block 29 is designed as a barb structure (as shown in FIG. 9, the included angles between one corner of the fixture block 29 and the horizontal and vertical planes are a and b, respectively, and a is greater than 1° (which may be 5°) and b is less than the friction angle (which may be 5°), in order to prevent the fixture block 29 from not being sharp enough to clamp the ratchet due to friction and wear; the barb structure ensures that the ratchet teeth can be reliably clamped even if there is wear, which increases the reliability of the structure.

The stop block tool hole 32 is matched with the ratchet lock nut 11, the spring 9 and the threaded pin 10. The ratchet lock nut 11 can be screwed, but it will be blocked by the fixture block 29 on the stop block 8 when being unscrewed reversely. During disassembling, the tool is inserted into the stop block tool hole 32 and the push-pull sleeve tool hole 59 to press the stop block 8 into the push-pull sleeve 1, and the ratchet lock nut 11 will be released smoothly.

Figure 10:
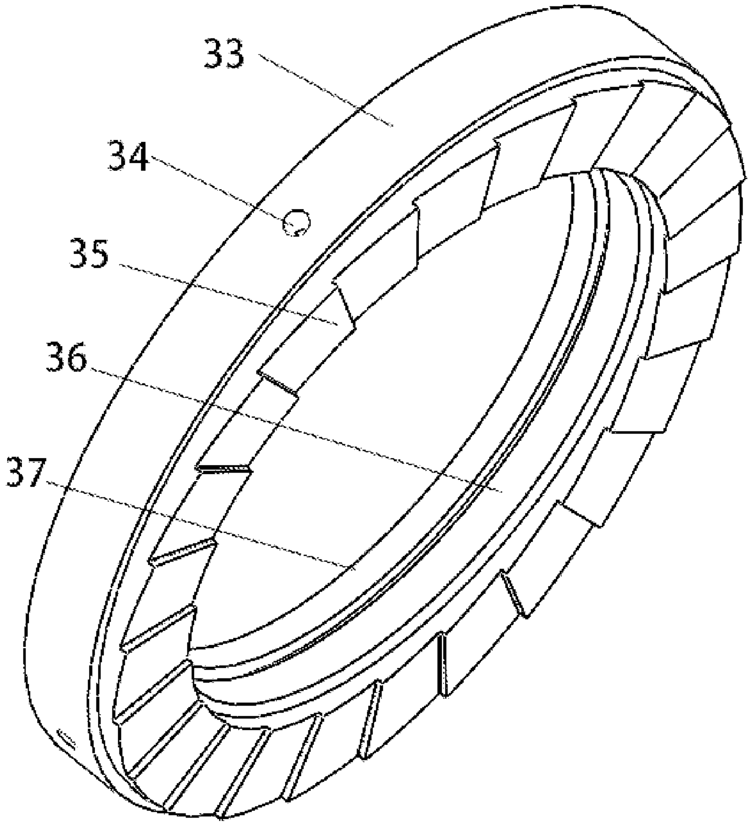
FIG. 10 is a structural diagram of a ratchet lock nut.

As shown in FIG. 10, one side of the ratchet lock nut 11 is provided with ratchet teeth 35, which are matched with the fixture block 29, and the shape of the ratchet teeth 35 is matched with the shape of the barb of the fixture block 29; the inside of the ratchet lock nut 11 is divided into two parts, one part is provided with a ratchet thread 36, and the plug housing 4 is provided with a thread B42, and the ratchet thread 36 is matched with the thread B42 to make the ratchet lock nut 11 press the push-pull sleeve 1, and the other part is provided with a smooth surface 37, and the inner diameter of the smooth surface 37 is smaller than the inner diameter of the ratchet thread 36, so as to avoid abrasion caused by contact between the ratchet thread 36 and the plug housing 4; the outer surface of the ratchet lock nut 11 is provided with a lock nut tool hole 34 for inserting a tool to lock the ratchet lock nut 11; the outer surface of the ratchet lock nut 11 is provided as a knurled surface 33, which is used to increase friction and facilitate disassembly and assembly.

Figure 4:
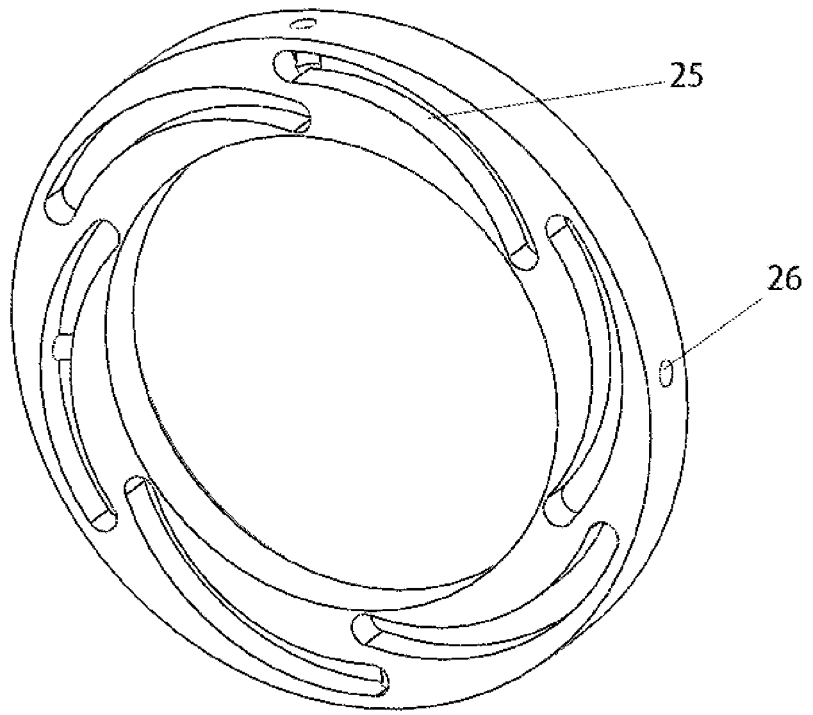
FIG. 4 is a structural diagram of a rotary sleeve.

FIG. 4 shows the rotary sleeve 2, and the slider pin groove 25 is an arc whose radius gradually increases with the angle; the outer diameter surface of the rotary sleeve 2 is provided with a tool hole 26 for inserting a tool to implement the rotation of the rotary sleeve 2 (when it is difficult to screw by hand, a special tool can be inserted into the tool hole 26 to assist in unscrewing); the slider pin groove 25 is matched with the slider pin, and the slider 5 is moved radially by rotating the rotary sleeve 2, so that the plug part and the socket part are locked and released. In FIG. 4, the slider pin groove 25 is 6 segments of circular arcs (the radius of circular arcs gradually increases with the angle; in this embodiment, it is designed as below: the smallest radius of the circular arc is 30 mm, and the largest radius is 36 mm, so that the slider can have a radial stroke of 6 mm (36-30) by rotation), but it is not necessarily 6 segments. The number of the circular arcs depends on the number of sliders, the size of the sliders, the insertion depth of the sliders and the bearing capacity. Because the tensile process is the process of shearing of the slider, the more the sliders, the larger the sliders and the deeper the sliders are inserted, the greater the bearing capacity, the longer the circular arc and the smaller the friction angle, the less likely it is to lock up in the process of lifting the sliders. Here, the circular arc has been designed as long as possible without affecting the strength.

A push-pull sleeve guide keyway 23 is arranged inside the push-pull sleeve 1, a plug housing guide keyway 41 is arranged outside the plug housing 4, and a guide key 7 is fixed on the plug housing guide keyway 41, and the push-pull sleeve guide keyway 23 is matched with the guide key 7 to ensure the uniqueness of the insertion of the push-pull sleeve 1, thereby ensuring that the angle of the push-pull sleeve 1 is consistent with the plug part and the socket part; the outer surface of the push-pull sleeve 1 is provided with a surface knurled structure 24 for increasing friction and facilitating push and pull.

Figure 6:
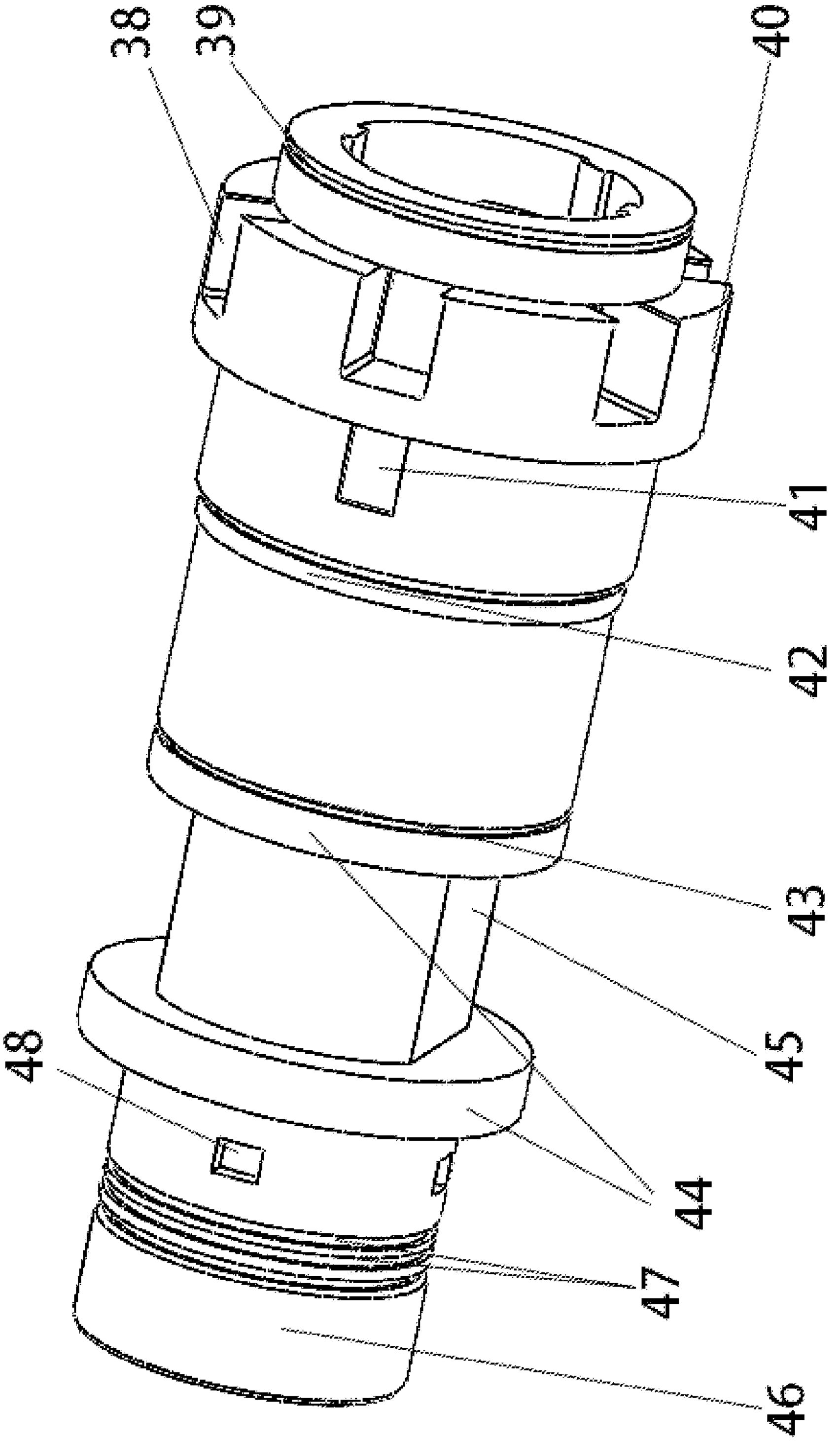
FIG. 6 is a structural diagram of a plug housing.

The material around the slider 5 on the plug housing 4 is thickened (its material thickness is greater than that of other parts, namely the reinforcing structure 40 in FIG. 6). The plug housing 4 is uniformly provided with slider mounting holes 38 in the radial direction, which are used for bearing force and providing guidance for the slider 5, and the slider 5 can move radially along the slider mounting holes 38. The hoop mounting structure A45 and the hoop mounting structure B53 are used to mount hoops for bearing force. Bearing boss A44 and bearing boss B52 with a certain thickness can ensure the safety and reliability of the structure. The screw thread A46 and the housing pin hole A48 are used for matching with other structures (such as the force-bearing cable housing). The sealing ring groove A47 is equipped with a waterproof sealing ring, and two sealing rings can be used to ensure reliable waterproof.

Figure 12:
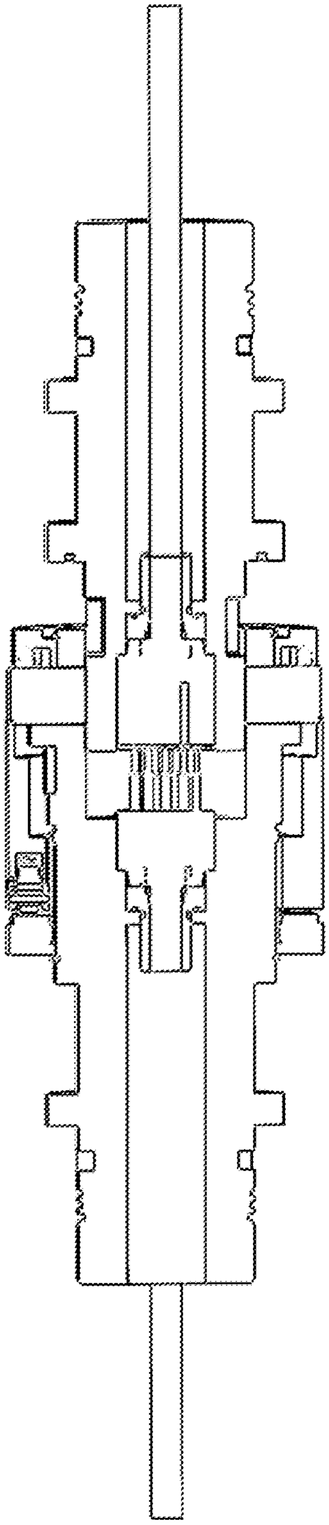
FIGS. 12 and 13 are schematic diagrams of a plug-in process.
Figure 13:
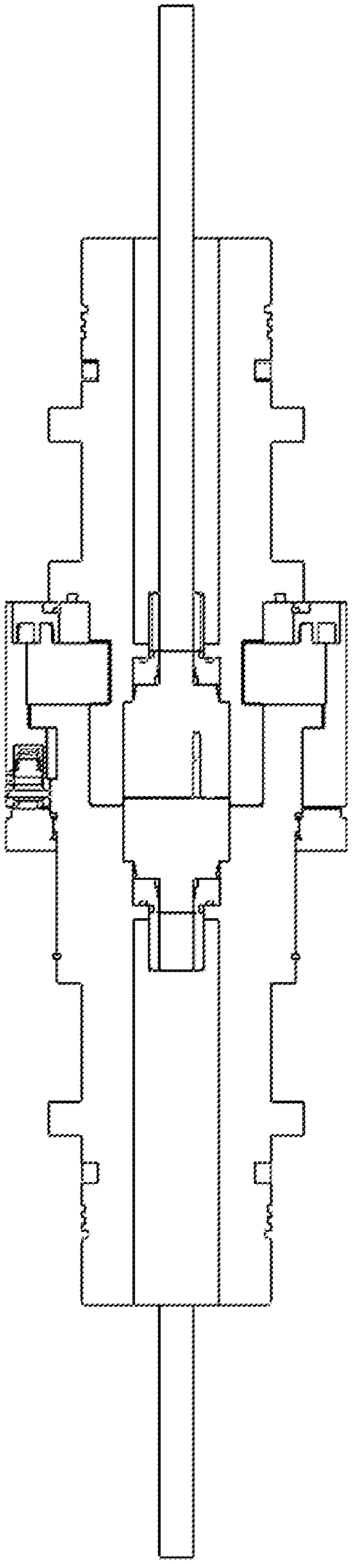

FIGS. 12 and 13 show the plug-in process of the fast self-adaptive rotary plug-in underwater force-bearing connector of the present disclosure:

Supposing the ratchet lock nut is locked at first:

1. pulling the stop block 8 into the push-pull sleeve 1 with a tool, such that the spring 9 is compressed;
2. unscrewing the ratchet lock nut 11; keeping the stop block 8 in the push-pull sleeve 1;
3. pulling the push-pull sleeve 1 away from the socket part, pulling out the tool in step 1, and the stop block 8 popping up;
4. rotating the rotary sleeve 2, and the slider 5 moving to the farthest place from the center of the circle and exiting the slider groove 50;
5. inserting the pin 13 into the jack 18 to insert the socket part into the plug part;
6. rotating the rotary sleeve 2, and the slider 5 moving to the nearest place to the center of the circle, so as to block the slider groove 50 (the slider 5 and the slider groove 50 cooperate to lock, and constitute the key component of the whole connector to bear a force);
7. pushing the push-pull sleeve 1 in the direction close to the socket, it should be ensured that the guide keyway 23 of the push-pull sleeve is aligned with the guide key 7, otherwise it cannot be pushed in;
8. screwing the ratchet lock nut 11 to press the push-pull sleeve 1, and the push-pull sleeve 1 covering the slider 5 and the rotary sleeve 2, so as to ensure that the rotary sleeve 2 will not be unlocked because the slider 5 is separated from the slider groove 50 due to unwanted external force factors.

Figure 14:
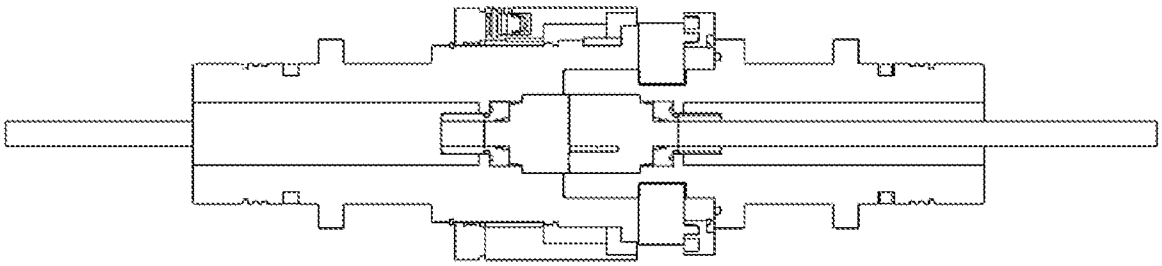
FIGS. 14 and 15 are schematic diagrams of a disassembly process.
Figure 15:
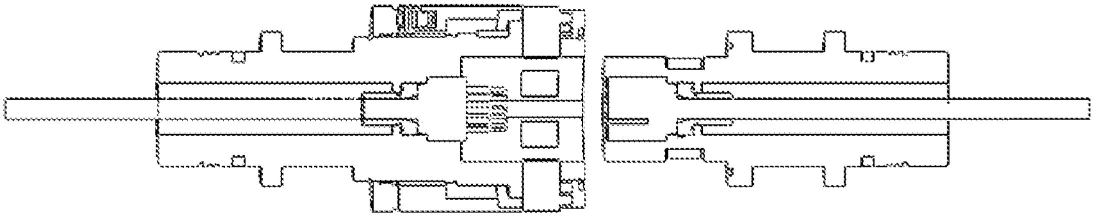

FIG. 14 and FIG. 15 show the disassembly process of the fast self-adaptive rotary plug-in underwater force-bearing connector of the present disclosure:

1. pulling the stop block 8 into the push-pull sleeve 1 with a tool;
2. unscrewing the ratchet lock nut 11;
3. pulling the push-pull sleeve 1 away from the socket part;
4. rotating the rotary sleeve 2, lifting the slider 5 to the highest position and exiting the slider groove 50;
5. pulling the pin 13 out of the jack 18, thus pulling the socket part out of the plug part.

Figure 16:
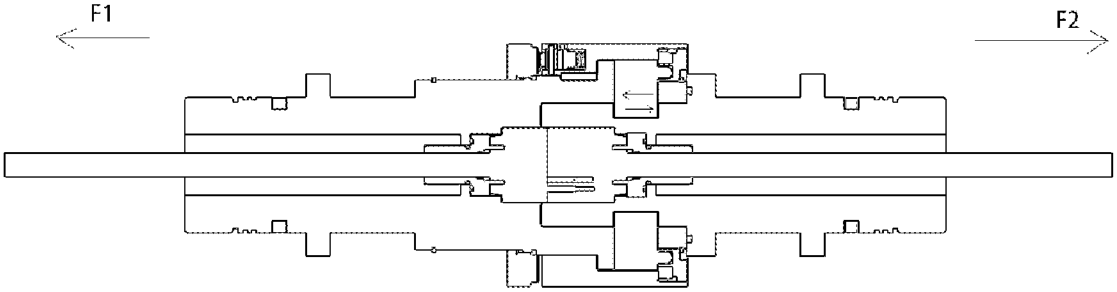
FIG. 16 is a stress diagram of a locked connector, in which the slider is subjected to a shear force.

As can be seen from FIG. 16, the structure of the present disclosure provides a locking function through a plurality of sliders and slider grooves, and the tensile force is mainly borne by the sliders, slider grooves, housing pin holes at both ends of the connector and threads; the size and number of the sliders, the size and number of the housing pin holes, the major diameter of threads and the length of threads ensure that the connector is normal and reliable under a large tensile force, and the connector will not fail under a large tensile force. The connector with the maximum outer diameter of 75 mm has passed the tensile test, in which it did not fail until the tensile force of 37 tons. At this time, the clamping part failed, but the slider was deformed and not broken.

What is claimed is:

1. A fast self-adaptive rotary plug-in underwater force-bearing connector, comprising a plug part and a socket part;

wherein the plug part comprises a plug housing, a pin provided in the plug housing, and a push-pull sleeve, a rotary sleeve, a front retaining ring, a ratchet lock nut and a rear retaining ring provided outside the plug housing; one end of the plug housing is provided with a submarine cable A; the plug housing is uniformly provided with slider mounting holes for mounting sliders along a radial direction, and the sliders are radially movable along the slider mounting holes; an inner wall of the plug housing is provided with an unequal-width key group for guiding the socket part, and the keys of the unequal-width key group are provided between the sliders; the plug housing is provided with a hoop mounting structure A, and both sides of the hoop mounting structure A are provided with force-bearing bosses A; the plug housing is also provided with a housing pin hole A and a thread A for connecting external equipment; the plug housing is provided with a sealing ring groove A for sealing between the external equipment and the plug housing, wherein the push-pull sleeve is configured to press the sliders and the rotary sleeve; an end of the push-pull sleeve is provided with a stop block mounting hole for mounting a stop block, wherein the stop block is configured to clamp the ratchet lock nut to prevent a threaded connection between the ratchet lock nut and the plug housing from being loosened, and the other end of the stop block is provided with a spring for ejecting the stop block to lock the ratchet lock nut; the push-pull sleeve is provided with a push-pull sleeve pin mounting hole for mounting a threaded pin, and the threaded pin is used for preventing the stop block from sliding out and rotating; the rotary sleeve is provided with a slider pin groove, and the slider is provided with a slider pin, and the slider pin groove is matched with the slider pin to implement a radial movement of the sliders by rotating the rotary sleeve and thereby implement the locking and unlocking of the plug part and the socket part; the plug housing is further provided with a rear retaining ring groove for mounting the rear retaining ring, wherein the rear retaining ring is configured to prevent the ratchet lock nut from slipping out; the plug housing is further provided with a front retaining ring groove for installing the front retaining ring, and the front retaining ring is configured to prevent the rotary sleeve from slipping out;

the socket part comprises a socket housing and a jack provided in the socket housing; the pin and the jack are matched to connect the plug part and the socket part; one end of the socket housing is provided with a submarine cable B which is provided coaxially with the submarine cable A; the socket housing is provided with a hoop mounting structure B, both sides of which are provided with force-bearing bosses B; the socket housing is provided with a slider groove matched with the slider and a bell mouth guide keyway group matched with the unequal-width key group, wherein an insertion end of the bell mouth guide keyway group is trumpet-shaped and thereby convenient for the unequal-width key group to be smoothly inserted within a certain angle range so as to insert the pin into the jack; the socket housing is also provided with a sand-proof sealing ring groove for mounting a sealing ring to prevent sand; the socket housing is further provided with a housing pin hole B and a thread C for connecting the external equipment; the socket housing is provided with a sealing ring groove B, and a sealing ring is provided at the sealing ring groove B to seal between the external equipment and the socket housing.

2. The fast self-adaptive rotary plug-in underwater force-bearing connector according to claim 1, wherein the unequal-width key group at least comprises two keys with unequal widths, which are configured to provide guidance for inserting the plug part into the socket part.

3. The fast self-adaptive rotary plug-in underwater force-bearing connector according to claim 1, wherein one end of the stop block is provided with a fixture block, and the other end thereof is provided with a spring mounting block, wherein the stop block is provided with a screw pin matching groove for matching with a screw pin, and is further provided with a stop block tool hole, and wherein the push-pull sleeve is provided with a push-pull sleeve tool hole, and tools are inserted into the stop block tool hole and the push-pull sleeve tool hole to move the stop block.

4. The fast self-adaptive rotary plug-in underwater force-bearing connector according to claim 3, wherein one side of the ratchet lock nut is provided with ratchet teeth for matching with the fixture block; the inside of the ratchet lock nut is divided into two parts; one part is provided with a ratchet thread, which is matched with a thread B provided on the plug housing, so that the ratchet lock nut presses the push-pull sleeve; and the other part is provided with a smooth surface, an inner diameter of which is smaller than that of the ratchet thread, thereby preventing abrasion caused by contact between the ratchet thread and the plug housing; an outer surface of the ratchet lock nut is provided with a lock nut tool hole for inserting a tool to lock the ratchet lock nut; the outer surface of the ratchet lock nut is designed as a knurled surface for increasing friction and facilitating assembly and disassembly.

5. The fast self-adaptive rotary plug-in underwater force-bearing connector according to claim 1, wherein the slider pin groove is an arc whose radius gradually increases with the angle; an outer surface of the rotary sleeve is provided with a tool hole for inserting a tool to implement the rotation of the rotary sleeve.

6. The fast self-adaptive rotary plug-in underwater force-bearing connector according to claim 1, wherein a push-pull sleeve guide keyway is provided inside the push-pull sleeve, a plug housing guide keyway is provided outside the plug housing, a guide key is fixed on the plug housing guide keyway, and the push-pull sleeve guide keyway is matched with the guide key to ensure the uniqueness of insertion of the push-pull sleeve; an outer surface of the push-pull sleeve is designed as a surface knurled structure for increasing friction and facilitating push and pull.

7. The fast self-adaptive rotary plug-in underwater force-bearing connector according to claim 1, wherein a material around the slider on the plug housing is thickened.

* * * * *